US010661600B2

(12) United States Patent
Franklin

(10) Patent No.: US 10,661,600 B2
(45) Date of Patent: May 26, 2020

(54) VEHICLE SUPPORT DEVICE

(71) Applicant: Dale C. Franklin, El Dorado, CA (US)

(72) Inventor: Dale C. Franklin, El Dorado, CA (US)

( * ) Notice: Subject to any disclaimer, the term of this patent is extended or adjusted under 35 U.S.C. 154(b) by 0 days.

(21) Appl. No.: 16/600,137

(22) Filed: Nov. 2, 2019

(65) Prior Publication Data

US 2020/0047546 A1 Feb. 13, 2020

Related U.S. Application Data

(60) Provisional application No. 62/862,538, filed on Jun. 17, 2019.

(51) Int. Cl.
| | | |
|---|---|---|
| *F16M 13/00* | (2006.01) |
| *B60B 7/02* | (2006.01) |
| *B60B 15/02* | (2006.01) |
| *B60B 3/00* | (2006.01) |

(52) U.S. Cl.
CPC ............... *B60B 7/02* (2013.01); *B60B 3/002* (2013.01); *B60B 15/025* (2013.01); *B60B 2340/52* (2013.01)

(58) Field of Classification Search
CPC ... B06G 9/003; B06G 9/00; B16F 5/00; B16F 5/50; B60B 7/02; B60B 15/025; B60B 3/002
USPC .......................... 248/351, 352, 647; 280/28.5
See application file for complete search history.

(56) References Cited

U.S. PATENT DOCUMENTS

| | | | | | |
|---|---|---|---|---|---|
| 3,624,853 | A | * | 12/1971 | Kromer | E01H 1/056 15/82 |
| 5,820,224 | A | * | 10/1998 | Dimatteo, Jr. | B60B 1/042 301/35.58 |
| 10,279,627 | B2 | * | 5/2019 | Raulerson, Jr. | B60C 7/08 |
| 2003/0201633 | A1 | * | 10/2003 | Bernard | B09B 3/00 280/762 |

(Continued)

*Primary Examiner* — Steven M Marsh
(74) *Attorney, Agent, or Firm* — Gerald R. Prettyman

(57) ABSTRACT

Disclosed is a vehicle support device comprising a polygonal surface which may be affixed to a front edge of an at least one circumferential plate (110) or to a midline of an at least one circumferential plate (110). The polygonal surface (105) may be a pentagon polygon having five sides, a hexagon polygon having six sides, an octagon polygon having eight sides, or any polygonal shape. The polygonal front surface may have an at least one asymmetrical side. The polygonal front surface (105) may have a plurality of lug bolt supports (120), which may have five lug bolt supports (120), seven lug bolt supports (120), eight lug bolt supports (120), or twelve lug bolt supports (120). The vehicle support device may have an axle support centerline (125), a vehicle support device centerline (130), and an non-zero centerline offset (135) between the axle support centerline (125) and the vehicle support centerline (130) to provide for offset alignment of the vehicle support device in a vehicle wheel well. The vehicle support device may be used to support any wheeled automobile, trailer or tractor, to provide levelness and stability of the vehicle, prevent UV and time or gravity-caused degradation of the tires, and extend the life of the tires, and on other vehicles with modification. For most automobiles, trailers, and tractors, the vehicle support device may replace one or more of the tires and wheels on an axle to securely and solidly support the vehicle on ground or a on concrete pad.

18 Claims, 11 Drawing Sheets

(56) References Cited

U.S. PATENT DOCUMENTS

2007/0052281 A1* 3/2007 Stuckel .................. B60B 7/04
　　　　　　　　　　　　　　　　　　　301/37.26
2011/0121090 A1* 5/2011 Price .................. A01G 25/092
　　　　　　　　　　　　　　　　　　　239/1

* cited by examiner

VEHICLE SUPPORT DEVICE

CROSS-REFERENCE TO RELATED APPLICATION

This application claims the benefit of priority of U.S. Provisional Patent Application 62/862,538 filed Jun. 17, 2019 and titled "VEHICLE SUPPORT DEVICE," the disclosure of which is incorporated by reference.

STATEMENT REGARDING FEDERALLY SPONSORED RESEARCH OR DEVELOPMENT

Not Applicable

BACKGROUND OF THE INVENTION

Field of Invention

The invention relates generally to the field of vehicle support devices and more specifically to devices for supporting static vehicle with axles.

Description of Related Art

A vehicle parked over a lengthy period can suffer tire degradation, which may change how level the vehicle rests, which can stress the automobile frame. To prevent this frame stress, or for other reasons, a vehicle owner may remove the tires and use other support devices.

Many vehicle support devices rest under the axle or the frame, and with or without securing clamps, simply hold up the axle or frame. Other vehicle support devices may slide over the axle end, but like vehicle support devices rest under the axle or the frame, lack the support provided by a tire.

SUMMARY OF THE INVENTION

Disclosed is a vehicle support device which may be used to support any wheeled automobile, trailer or tractor, to provide levelness and stability of the vehicle, prevent UV and time or gravity-caused degradation of the tires, and extend the life of the tires, and on other vehicles with modification. For most automobiles, trailers, and tractors, the vehicle support device may replace one or more of the tires and wheels on an axle to securely and solidly support the vehicle on ground or a on concrete pad.

A typical vehicle support device may have polygonal surface with an axle support, a plurality of lug bolt supports, and at least one outer tangential circumferential plate for supporting the vehicle and strengthening the vehicle support device. The polygonal surface may be aligned to a common edge of the circumference of flat plates, or may be affixed to a midline (e.g., centered like an I-Beam) within the at least one outer tangential circumferential plat. A vehicle support device may also have at least one rear circumferential plate on the opposite side from the polygonal surface to provide additional strength for the supporting the vehicle.

For most vehicles with two axles and each axle having at least one left wheel with a tire and at least one right wheel with a tire, a vehicle support device may be placed over the axle and the requisite number of lug bolts (a.k.a. studs), typically, 5, 6, 8 or 12, which are affixed to a wheel hub which is affixed to the axle.

Vehicles may have different size wheels, different size tires, and different size or shaped wheel wells. Also, some tractors and trailers have adjacent axles. To accommodate these differences, the vehicle support device may have a vertical centerline offset i.e., an offset axle support centerline. The polygonal shape may be symmetrical or asymmetrical.

A vehicle support device may be made of any material suitable for supporting a vehicle. A metal such as steel or aluminum would be a typical material, but a lesser material may be used for a less heavy vehicle, while a stronger, e.g. denser, material could be used for a heavier vehicle.

To use the vehicle support device, the vehicle is raised slightly to remove the wheel and tire. A properly sized vehicle support device with properly aligned (offset)-axle support and proper number of lug bolt supports is then placed on the axle, positioned such that a flat side is aligned with the horizontal surface (ground or pad), and the vehicle lowered so the vehicle support device is supporting the device. Shim devices may be used to level the vehicle.

Disclosed is a vehicle support device comprising a polygonal surface (105), an at least one outer tangential circumferential plate (110), an axle support (115), a plurality of lug bolt supports (120), an axle support centerline (125), a vehicle support device centerline (130) and an edge affixment (140) to affix an at least one outer tangential circumferential plate (110) to the polygonal surface (105).

The polygonal surface (105) may be affixed to a front edge of the at least one outer tangential circumferential plate (110). The polygonal surface (105) may be affixed to an internal midline (855) of the at least one outer tangential circumferential plate (110).

The polygonal surface (105) may be a pentagon polygon having five sides, a hexagon polygon having six sides, or an octagon polygon having eight sides. The polygonal surface (105) may have at least one asymmetrical side (905).

The plurality of lug bolt supports (120) may have five lug bolt supports (120), seven lug bolt supports (120), eight lug bolt supports (120), or twelve lug bolt supports (120).

The vehicle support device may have an axle support centerline (125), a vehicle support device centerline (130), and a vertical centerline offset (135) (which may be zero or non-zero) between the axle support centerline (125) and the vehicle support device centerline (130) to provide for offset alignment of the vehicle support device in a vehicle wheel well.

A first at least one outer tangential circumferential plate (510) may have a wider longitudinal width (w1) than a second at least one outer tangential circumferential plate (510). A first at least one outer tangential circumferential plate (510) may have a narrower longitudinal width (w1) than a second at least one outer tangential circumferential plate (510). A first at least one outer tangential circumferential support plate (510) may have a lateral width (w2) wider than a second at least one outer tangential circumferential support plate (510). A first at least one outer tangential circumferential plate (510) may have a narrower lateral width (w2) than a second at least one outer tangential circumferential plate (510).

DETAILED DESCRIPTION OF THE INVENTION

Figure 1:
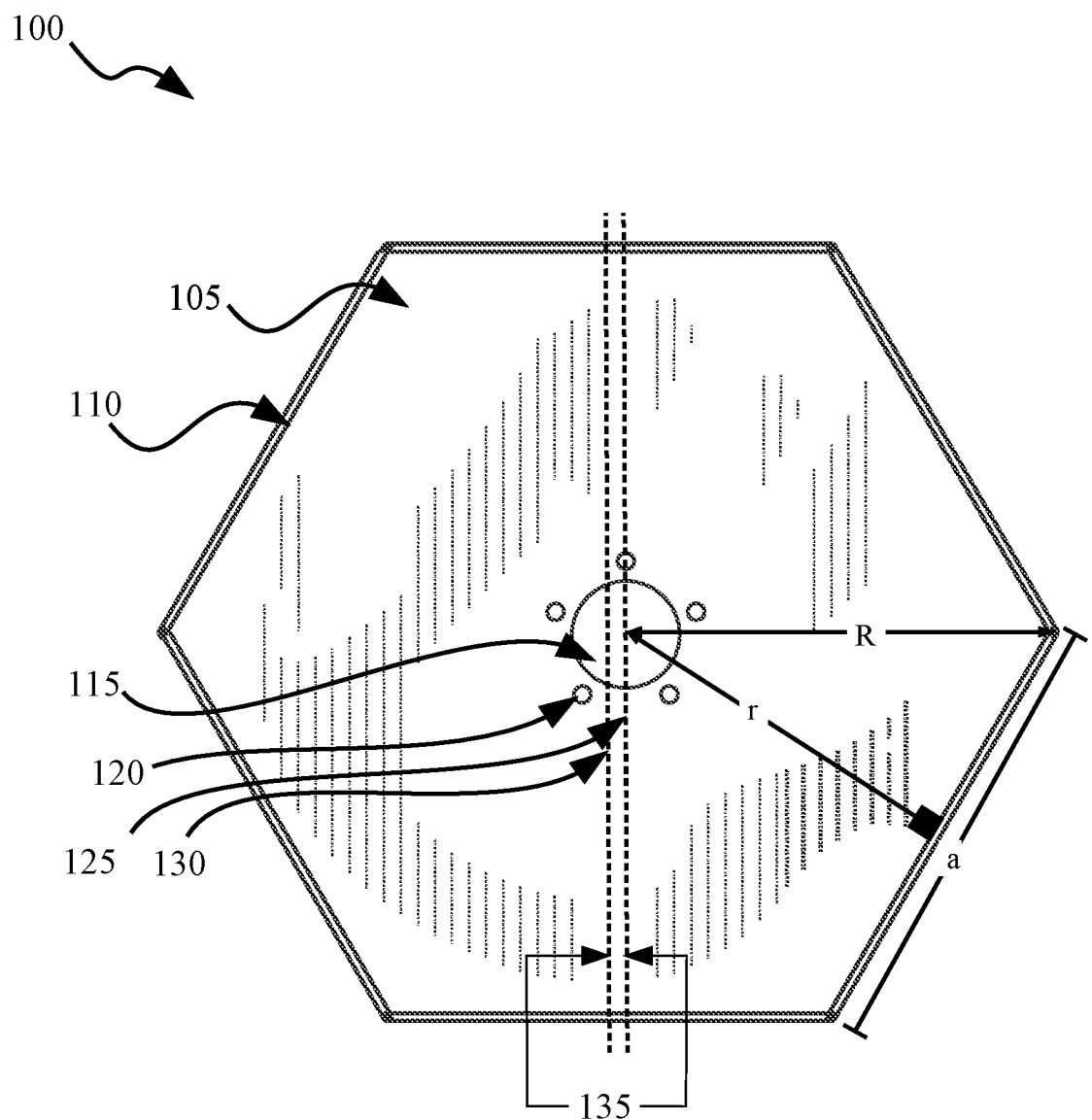
FIG. 1 shows a front plan view of a vehicle support device (100) having a hexagonal construction with a plurality of lug bolt supports (120).

FIG. 1 shows a front plan view of a vehicle support device (100) having a hexagonal construction with five of a plurality of lug bolt supports (120). This construction may be abbreviated as VSD6/5.

Shown in FIG. 1 is a vehicle support device (100) with a plurality of lug bolt supports (VSD6/5) comprising a polygonal surface (105), an at least one outer tangential circumferential plate (110), an axle support (115), a plurality of lug bolt supports (120), an axle support centerline (125), a vehicle support device centerline (130), a vertical centerline offset (135) between the axle support centerline (125) and the vehicle support device centerline (130), an edge affixment (140) for an at least one outer tangential circumferential plate (110) to the polygonal surface (105), a circumradius (R), an apothem (r), and a side length (a).

The polygonal surface (105) provides structural support for the vehicle support device, and for the supported vehicle. Several factors must be balanced when selecting specifications for the polygonal surface (105). First among these factors are the weight of the vehicle, the number of axles on the vehicle, the stability of the surface on which the vehicle support device will rest, the grade of the surface on which the vehicle support device will rest, static use of the vehicle (i.e., storage, occupancy, etc.) during support by the vehicle support device, and intended duration of use. Other factors pertain to the vehicle support device, and may adjusted to account for provide a desired safety factor, including thickness of the polygonal surface (105), and whether each axle could and should would have one or two vehicle support devices per side. Other factors may need consideration, as discussed below.

The vehicle support device (100) and other variations described here, as well as contemplated or within the scope of description, may be made of any material suitable for supporting a vehicle for the conditions stated above. A metal such as steel or aluminum would be a typical material, but a lesser material may be used for a less heavy vehicle, while a stronger, e.g. denser material or a higher grade steel could be used for a heavier vehicle. The polygonal surface (105) has a polygonal surface thickness (t1), see FIG. 3, likewise commensurate with the determined conditions stated above. Other materials might also be used, e.g., concrete, wood, plastic, plastics, other artificial materials, etc.

Around the polygonal surface (105) are an at least one outer tangential circumferential plate (110), with the at least one outer tangential circumferential plate (110) typically matching the polygonal configuration of the vehicle support plate, A hexagonal vehicle support device could thus have six of the at least one outer tangential circumferential plate (110).

As shown in FIG. 1, the polygonal surface (105) is affixed to a front edge of the at least one outer tangential circumferential plate (110). In this configuration, the at least one outer tangential circumferential plate (110) is securely affixed to the polygonal surface (105) between the polygonal surface (105) and the surface on which the vehicle support device will rest to provide support for the vehicle support device (100) and thus for the supported vehicle.

As with the polygonal surface (105), several factors must be considered when selecting specifications for the at least one outer tangential circumferential plate (110).

First among these factors are the weight of the vehicle, the number of axles on the vehicle, the stability of the surface on which the vehicle support device will rest, the grade of the surface on which the vehicle support device will rest, static use of the vehicle (i.e., storage, occupancy, etc.) during support by the vehicle support device, and intended duration of use.

Other factors pertain to the at least one outer tangential circumferential plate (110), keeping in mind that each at least one circumferential plate may adjusted to account for provide a desired safety factor, including thickness of the polygonal surface (105), the type and reliability of secure affixment of the at least one circumferential plate to the polygonal surface (105), and whether each axle could and should would have one or two vehicle support devices per side. Other factors may need consideration, as discussed below.

An at least one outer tangential circumferential plate (110) may be made of any material suitable for supporting a vehicle for the conditions stated herein. A metal such as steel or aluminum would be a typical material, but a lesser material may be used for a less heavy vehicle, while a stronger, e.g. denser material or higher grade steel could be used for a heavier vehicle. The at least one outer tangential circumferential plate (110) has a thickness likewise commensurate with the determined conditions stated above. Other materials might also be used, e.g., concrete, wood, plastic, plastics, other artificial materials, etc. The at least one outer tangential circumferential plate (110) may be welded to the polygonal surface (105). The at least one outer tangential circumferential plate (110) may be integrated by fabrication to the polygonal surface (105).

An axle support (115) provides support for the axle and for securing the axle to the vehicle support device. The axle support (115) must be sized to the axle, keeping in mind the specifications used to fabricate the polygonal surface (105), manufacturing tolerance capabilities, whether an axle support collar will be used (along with the previous two factors), and whether material differences between the polygonal surface (105) and the axle may lead to corrosion during use, thereby necessitating intervening materials or anti-corrosion efforts.

A plurality of lug bolt supports (120) provides support for the lug bolts, here, five in number, and for securing the axle to the vehicle support device.

The plurality of lug bolt supports (120) must be sized to the lug bolts, as well as to the number of lug bolts on the axle, and the distance and angle with respect to the axle, and keeping in mind the specifications used to fabricate the polygonal surface (105), manufacturing tolerance capabilities, and whether material differences between the polygonal surface (105) and the lug bolts may lead to corrosion during use, thereby necessitating intervening materials or anti-corrosion efforts.

Although FIG. 1 shows five lug bolt supports for the plurality of lug bolt supports (120), other numbers of lug bolt supports (120) may be used. For axles having six lug bolts, the vehicle support device can have six lug bolt supports for the plurality of lug bolt supports (120). For axles having eight lug bolts, the vehicle support device can have eight lug bolt supports for the plurality of lug bolt supports (120). For axles having twelve lug bolts, the vehicle support device can have twelve lug bolt supports for the plurality of lug bolt supports (120).

The vehicle support device can have any number of lug bolt supports (120), so long as vehicle support device (100) has the proper number and alignment of lug bolt supports (120) as the axle has lug bolts.

In general, a vehicle without tandem axles, i.e., a two axle vehicle, will have the axle centered within a space around the axles, i.e., the wheel well. For such vehicles, a vehicle support device (100) may be fabricated to conform within the wheel well without concern for other structures.

Tandem axle vehicles, however, may have overlapping wheel wells, i.e., spacing between the axles is less than spacing between the axles and any horizontally adjacent outer body shell of the vehicle. In such instances, a plurality of side-by-side vehicle support devices may overlap, and possibly stability concerns.

To mitigate stability concerns from overlapping vehicle support devices, the axle support (115) and the plurality of lug bolt supports (120) may be horizontally aligned to one side so that side (left, right) of the vehicle support device is offset some distance to allow a second vehicle support device on a second axle.

To provide for this offset, a vehicle support device (100) may have an axle support centerline (125), a vehicle support device centerline (130), and a non-zero vertical centerline offset (135) between the axle support centerline (125) and the vehicle support device centerline (130). The axle support centerline (125) is offset from the vehicle support device centerline (130) to comprise a non-zero vertical centerline offset (135). A vertical centerline offset (135) might, for example, be considered a negative offset if the axle support centerline (125) is left of the vehicle support device centerline (130), and might be considered a positive offset if the axle support centerline (125) is right of the vehicle support device centerline (130).

As shown on FIG. 1, the axle support centerline (125) provides a physical location of a vertical centerline through the axle support (115), a vehicle support device centerline (130) to provide a physical location of a vertical centerline through vehicle support device (100), and a calculated determination of a vertical centerline offset (135) between the axle support centerline (125) and the vehicle support device centerline (130).

For any use of a vehicle support device with tandem axles, a determination of axle to axle spacing compared to axles to wheel well spacing should be made. If the axle to axle spacing is the same as the axle to wheel well spacing, then the offset is zero, and an offset vehicle support device is not needed. Similarly, if the axle to axle spacing is greater than the axle to wheel well spacing, then an offset vehicle support device is not needed. If though, the axle to axle spacing is less than the axle to wheel well spacing, then an offset vehicle support device is needed.

In such an instance, a pair of vehicle support devices might be sued, with a first vehicle support device having an axle support centerline (125) right of the vehicle support device centerline (130), and a second vehicle support device having an axle support centerline (125) left of the vehicle support device centerline (130).

Figure 2:
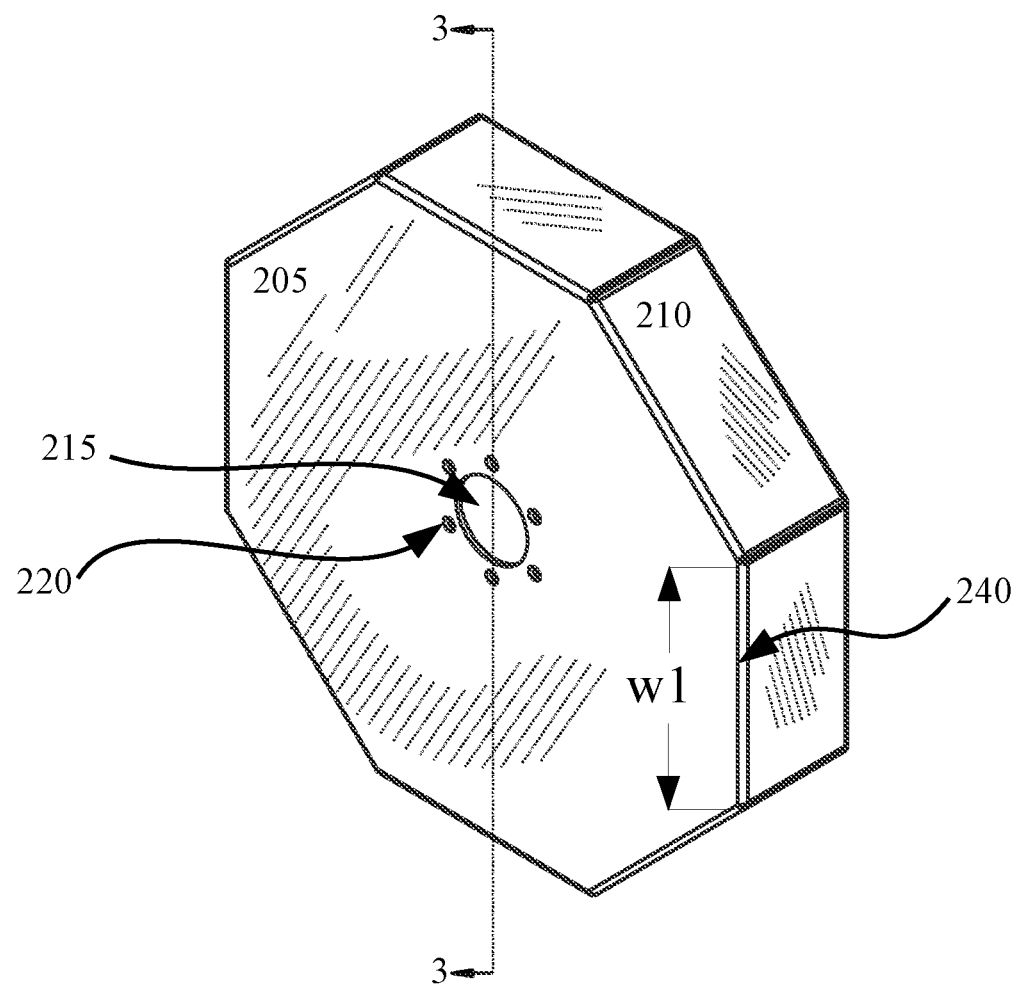
FIG. 2 shows a front right perspective view of a vehicle support device (200) having an octagonal construction with a plurality of lug bolt supports and at least one outer tangential circumferential plate.

FIG. 2 shows a front right perspective view of a vehicle support device (200) having an octagonal construction with six of a plurality of lug bolt supports and an at least one outer tangential circumferential plate. This construction may be abbreviated as VSD8/6.

Shown in FIG. 2 is an octagonal vehicle support device with six of a plurality of lug bolt supports (VSD8/6) comprising a polygonal surface (205), an at least one outer tangential circumferential plate (210), an axle support (215), a plurality of lug bolt supports (220), and an edge affixment (240) for an at least one outer tangential circumferential plate (210) to the polygonal surface (205), and a longitudinal width (w1) of the at least one outer tangential circumferential plate (210).

As shown in FIG. 2, the at least one outer tangential circumferential plate (210) may have a flat profile for typical use on flat and level surfaces. The at least one outer tangential circumferential plate (210) may have a contoured profile for surfaces which are not flat, or may be angled for surfaces which are not level.

The at least one outer tangential circumferential plate (210) may be tangentially affixed to the polygonal surface (205) via the edge affixment (240). A tangential affixment allows use of the vehicle support device (200) on flat horizontal surfaces. The edge affixment (240) may have any angle as needed for the particular circumstance.

To provide a secure affixment, the at least one outer tangential circumferential plate (210) may be welded to the polygonal surface (205). Any affixment method may be used to provide for permanent or temporary affixment commensurate with use.

The at least one outer tangential circumferential plate (210) has a longitudinal width (w1). A shown in FIG. 2, the longitudinal width (w1) of the at least one outer tangential circumferential plate (210) may be sized equal to the base width (b) of the polygonal surface.

Potentially, the longitudinal width (w1) of the at least one outer tangential circumferential plate (210) may be sized shorter than the size of the polygonal surface (205) of the vehicle support device. This could, however, leave gaps between the at least one outer tangential circumferential plate (210) and weaken the support strength of the vehicle support device.

Likewise, the longitudinal width (w1) of the at least one outer tangential circumferential plate (210) may be sized longer than the size of the polygonal surface (205) of the vehicle support device. This would though create limitation difficulties for construction, installation, and safety.

Figure 3:
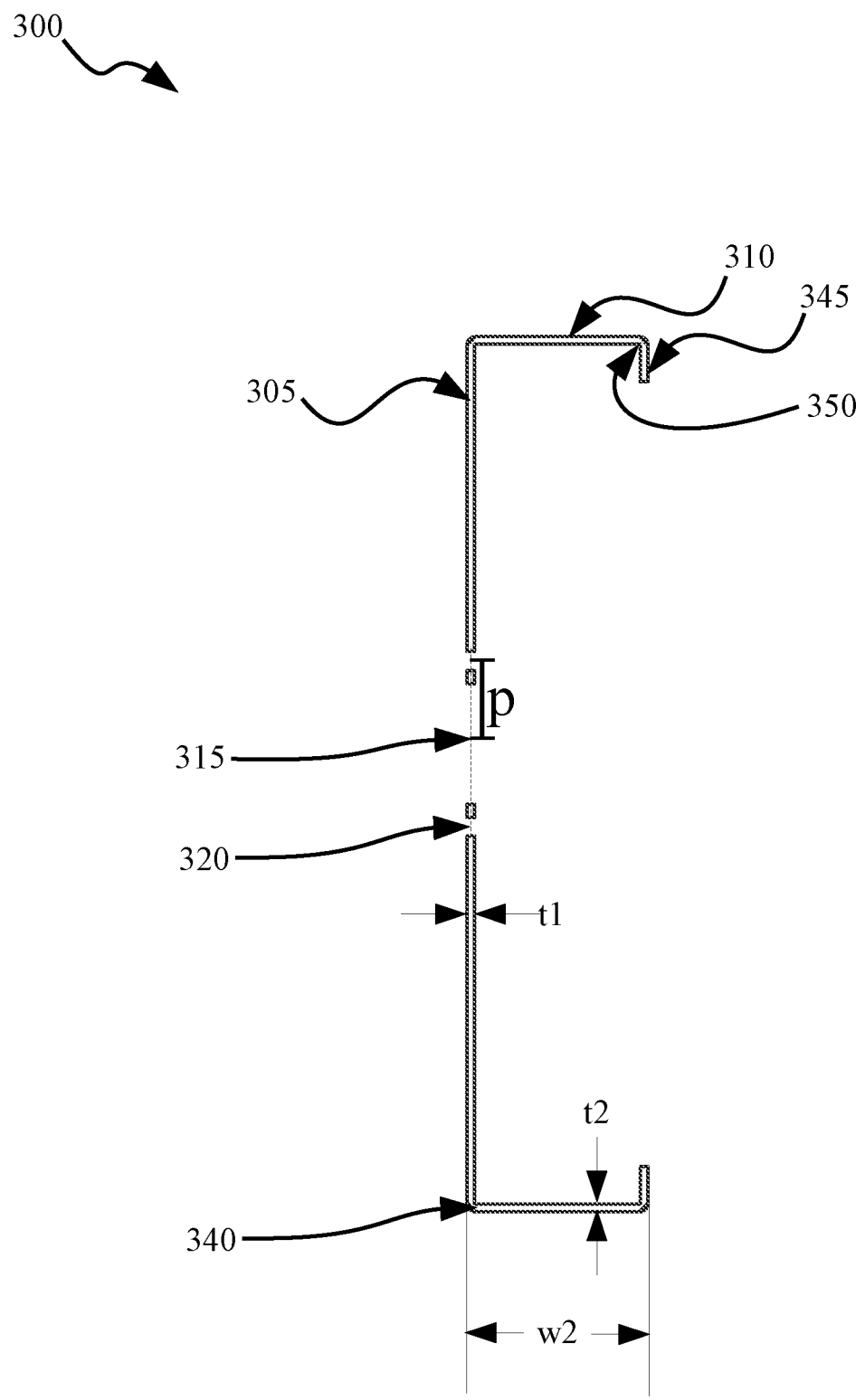
FIG. 3 shows a center section view of a vehicle support device (300) with an at least one outer tangential circumferential plates and an at least one rear parallel circumferential plate.

FIG. 3 shows a center section view as indicated by FIG. 2 of a vehicle support device (300) with a plurality of outer tangential circumferential plates and a plurality of rear parallel circumferential plates.

Shown in section view in FIG. 3 are the polygonal surface (305), an at least one outer tangential circumferential plate (310), an axle support (315), a plurality of lug bolt supports (320), an edge affixment (340) for an at least one outer tangential circumferential plate (310) to the polygonal surface (305), an at least one rear circumferential plate (345), an at least one circumferential support plate rear edge affixment (350), a polygonal surface thickness (t1), an at least one outer tangential circumferential plate thickness (t2), a lug bolt support pitch ('p') between a center of the axle support (315) and the plurality of lug bolt supports (320), and a lateral width (w1) of the at least one outer tangential circumferential plate (310), and a thickness (t2) of the at least one outer tangential circumferential plate (310).

The polygonal surface thickness (t1) may be determined for the anticipated use and safety factor as discussed in regards to FIG. 1 above.

And, as indicated by FIG. 3, a lug bolt support pitch ('p') exists between the center of the axle support (315), and the plurality of lug bolt supports (320). While the lug bolt support pitch (pa) between the center of the axle support (315) and the plurality of lug bolt supports (320) can be fabricated to any measurement desired, the lug bolt support pitch (p) must be conform to the hub configuration. As this lug bolt support pitch (p) is often standardized, fabrication dimensions and tolerances should be ascertained to assure a working and safe affixment of the axle of the vehicle to the vehicle support device (300).

As indicated by FIG. 3, the at least one outer tangential circumferential plate (310) has a lateral width (w2), which extends from a front edge of the at least one outer tangential circumferential plate (310) at the polygonal surface (305) to a rear edge, at which may be affixed an at least one rear circumferential plate (345).

The at least one rear circumferential plate (345) may be used to (1) increase the strength of the vehicle support device (300) affixing the plurality of rear circumferential plates (345) to each other, and (2) provide a barrier to the ingress of debris into the vehicle support device (300).

Affixing the at least one rear circumferential plate (345) to the at least one outer tangential circumferential plate (310) is an at least one circumferential support plate rear edge affixment (350). The at least one circumferential support plate rear edge affixment may be a weld between the at least one rear circumferential plate (345) and the at least one outer tangential circumferential plate (310). Any affixment method may be used to provide for permanent or temporary affixment commensurate with use.

As with the polygonal surface thickness (t1), the thickness (t2) and lateral width (w2) of the at least one outer tangential circumferential plate (310) must be commensurate with intended use. A designer should consider that only one of the at least one outer tangential circumferential plate (310) may rest on a supporting surface (i.e., ground or pad) and that the at least one outer tangential circumferential plate (310) operates to both support and stabilize the vehicle on the supporting surface. In determining thickness t2 and lateral width w2 of the at least one outer tangential circumferential plate (310), a designer should conduct a thorough engineering design evaluation and consider at least the material of the vehicle support device (300), the weight of the supported vehicle, the solidity and stability of the supporting surface, and the environment, particularly the presence of potentially corroding substances of the vehicle support device (300).

Figure 4:
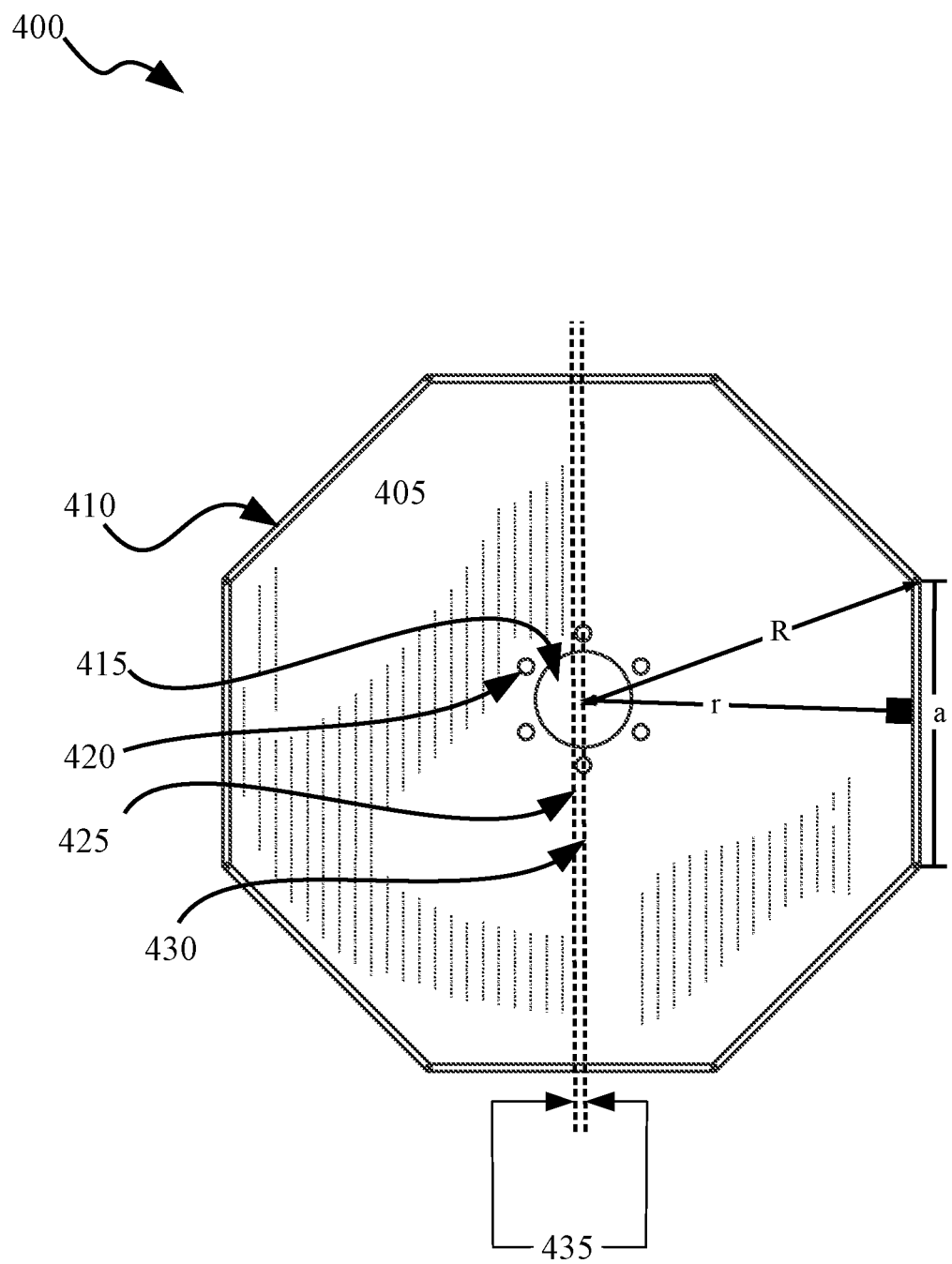
FIG. 4 shows a front plan view of a vehicle support device having an octagonal construction with a plurality of lug bolt supports.

FIG. 4 shows a front plan view of a vehicle support device (400) having an octagonal construction with six of a plurality of a lug bolt supports (420). This construction may be abbreviated as VSD8/6.

Shown in FIG. 4 is a vehicle support device (400) with six of a plurality of lug bolt supports (VSD8/6) comprising a octagonal surface (405), an at least one outer tangential circumferential plate (410), an axle support (415), a plurality of lug bolt supports (420), an axle support centerline (425), a vehicle support device centerline (430), and a vertical centerline offset (435) between the axle support centerline (425) and the vehicle support device centerline (430), an edge affixment (440) for an at least one outer tangential circumferential plate (410) to the polygonal surface (405), and a circumradius (R), an apothem (r), and a side length (a).

The octagonal vehicle support device (400) with a plurality (six) of lug bolt supports (VSD8/6) provides an option with circumferential plates of less arc, and thereby of less length of the circumferential plates, but which can be made a wide as desired, and for axles with six lug bolts.

Figure 6:
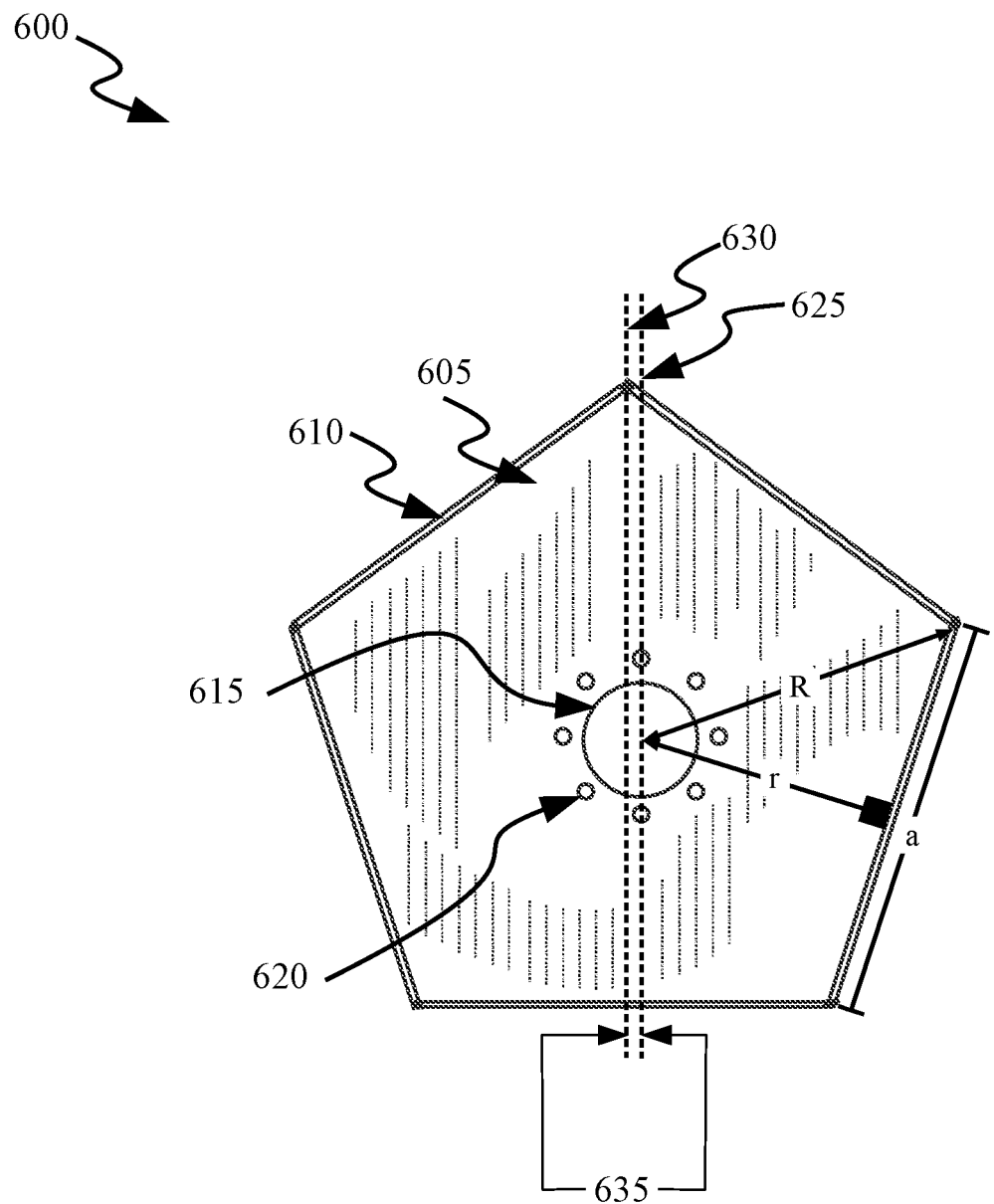
FIG. 6 shows a front plan view of a vehicle support device (600) having a pentagonal construction with a plurality of lug bolt supports.

As with the hexagonal vehicle support device (VSD6/x), an octagonal surface (405) provides structural support for the vehicle support device, and for the supported vehicle, and likewise, several factors must be considered when selecting specifications for the polygonal surface (105), including thickness (t1) (see FIG. 6).

First among these factors are the weight of the vehicle, the number of axles on the vehicle, the stability of the support surface on which the vehicle support device will rest, the grade of the surface on which the vehicle support device will rest, static use of the vehicle (i.e., storage, occupancy, etc.) during support by the vehicle support device, and intended duration of use. Other factors pertain to the vehicle support device, and may adjusted to account for provide a desired safety factor, including thickness of the polygonal surface (405), and whether each axle could and should would have one or two vehicle support devices per side.

As with the hexagonal vehicle support device (100), the octagonal vehicle support device (400) can be made with five, six, eight, twelve, or any number of lug bolt supports as desired.

Figure 5:
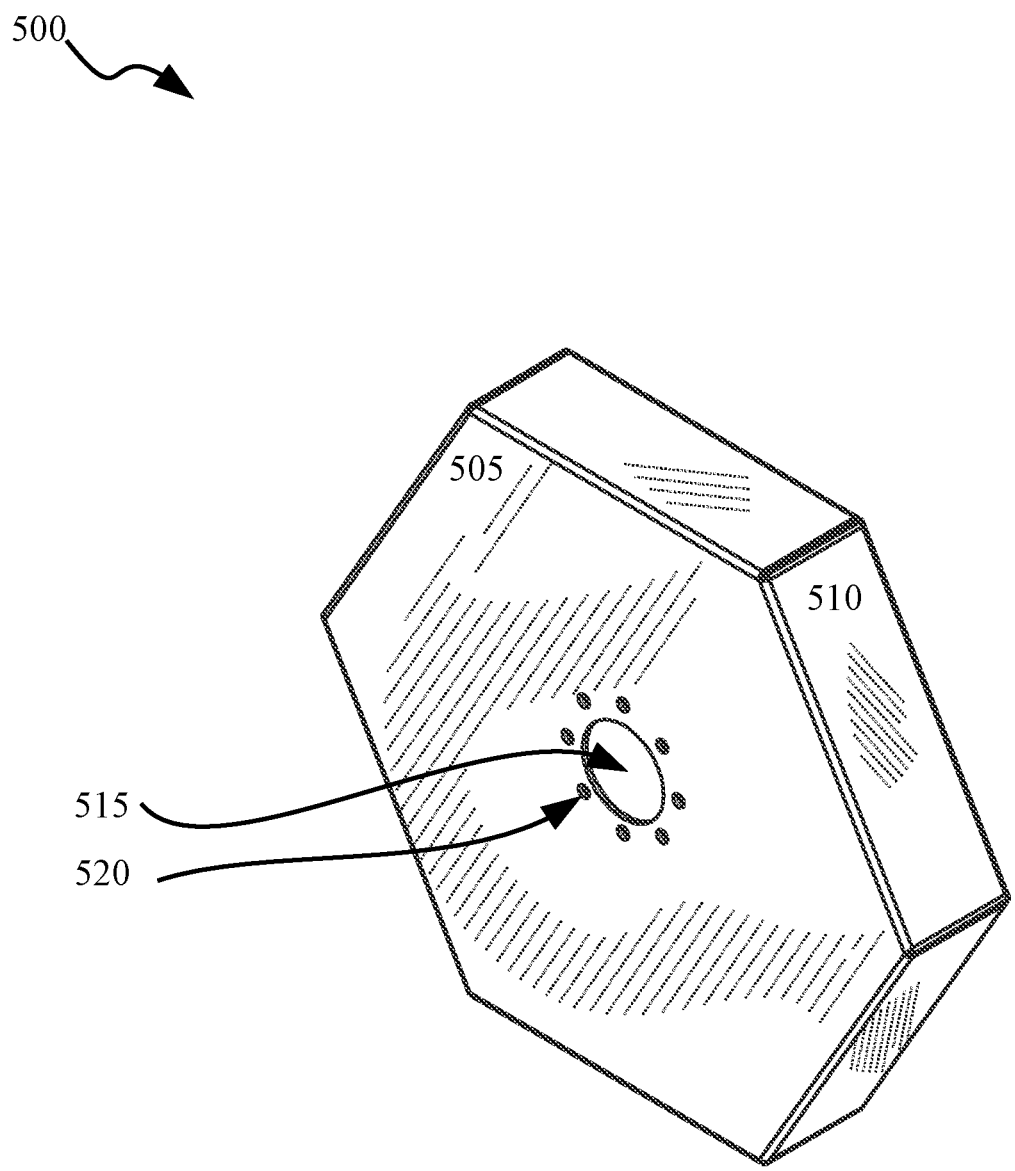
FIG. 5 shows a front right perspective view of a vehicle support device (500) having a hexagonal construction with a plurality of lug bolt supports and an at least one outer tangential circumferential plate.

FIG. 5 shows a front right perspective view of a vehicle support device (500) having a hexagonal construction with eight of a plurality of lug bolt supports and an at least one tangential circumferential plate. This construction may be abbreviated as VSD8/8.

Shown in FIG. 5 is a hexagonal vehicle support device (500) with eight of a plurality of lug bolt supports (VSD8/5) comprising a polygonal surface (505), an at least one outer tangential circumferential plate (510), an axle support (515), and a plurality of lug bolt supports (520).

As with the octagonal vehicle support device (400), the hexagonal vehicle support device (500) can be made with any number of a plurality of lug bolt supports (520), including five, six, eight, twelve, or any number of lug bolts supports as desired.

Similarly, the hexagonal vehicle support device (500) may have any number of the at least one outer tangential circumferential plate (510). Given that typically only one of the at least one outer tangential circumferential plate (510) may be in contact with a supporting surface, the hexagonal vehicle support device (500) may have only one the at least one outer tangential circumferential plate (510).

As earlier stated, design of a vehicle support device (100) must consider multiple factors, including the supported vehicle, supporting surface, and space considerations within a wheel well.

Standardized designs, however, having complete symmetry of the at least one outer tangential circumferential plate (510), may result in units incapable of proper support and fitting within space considerations of certain wheel wells.

A user might find, therefore, that a vehicle support device, (ignoring for a moment polygonal shape and the number of the plurality of lug bolt supports needed), an least one asymmetrical circumferential plate might be useful.

A first at least one outer tangential circumferential plate (510) may have a wider longitudinal width (w1) than a second at least one outer tangential one circumferential plate (510).

A first at least one of outer tangential circumferential plate (510) may have a narrower longitudinal width (w1) than a second at least one outer tangential circumferential plate (510).

A first at least one outer tangential circumferential plate (510) may have wider lateral width (w2) than a second at least one outer tangential circumferential plate (510).

A first at least one outer tangential circumferential plate (510) may have a narrower lateral width (w2) than a second at least one outer tangential circumferential plate (510).

FIG. 6 shows a front plan view of a vehicle support device (600) having a pentagonal construction with eight of a plurality of lug bolt supports. This construction may be abbreviated as VSD5/8.

Shown in FIG. 6 are a pentagonal vehicle support device (600) with eight of a plurality lug bolt supports (VSD5/8) comprising a polygonal surface (605), an at least one outer tangential circumferential plate (610), an axle support (615), a plurality of lug bolt supports (620), an axle support centerline (625), a vehicle support device centerline (630), and a vertical centerline offset (635) between the axle support centerline (625) and the vehicle support device centerline (630).

As shown in FIG. 6, a vehicle support device may have any polygonal shape. The precise polygonal shape should be decided on a balance of factors. Lower number sided polygonal shapes, such as triangle, square or pentagon, would have longer sides than an equally tall (base to peak) but higher number sided polygons, to wit, hexagonal heptagon, octagon, etc., and a longer side provides for a wider at least one circumferential plate. Lower number sided polygonal shapes, however, can also require more installation effort, such as turn an axle to align the polygon with the support base, and a greater likelihood of base overlap for dual axle installation.

As shown in FIGS. 1, 4, and 6, each polygonal shape has dimensional characteristics circumradius (R), apothem (r), and side length (a). These factors can be important in deciding which polygonal shape for a particular use.

For example, comparing FIG. 1 with FIGS. 4 and 6, and presuming that the circumradius (R) is the same, (i.e., as though compared to a radius of a tire), polygons of a lower number sides have a longer side length (a), but a shorter apothem (r). In such circumstances, a higher number sided polygon may better fit within a wheel well, but with a smaller at least one outer tangential circumferential plate in contact with the support surface, at least one outer tangential circumferential plate.

Figure 7:
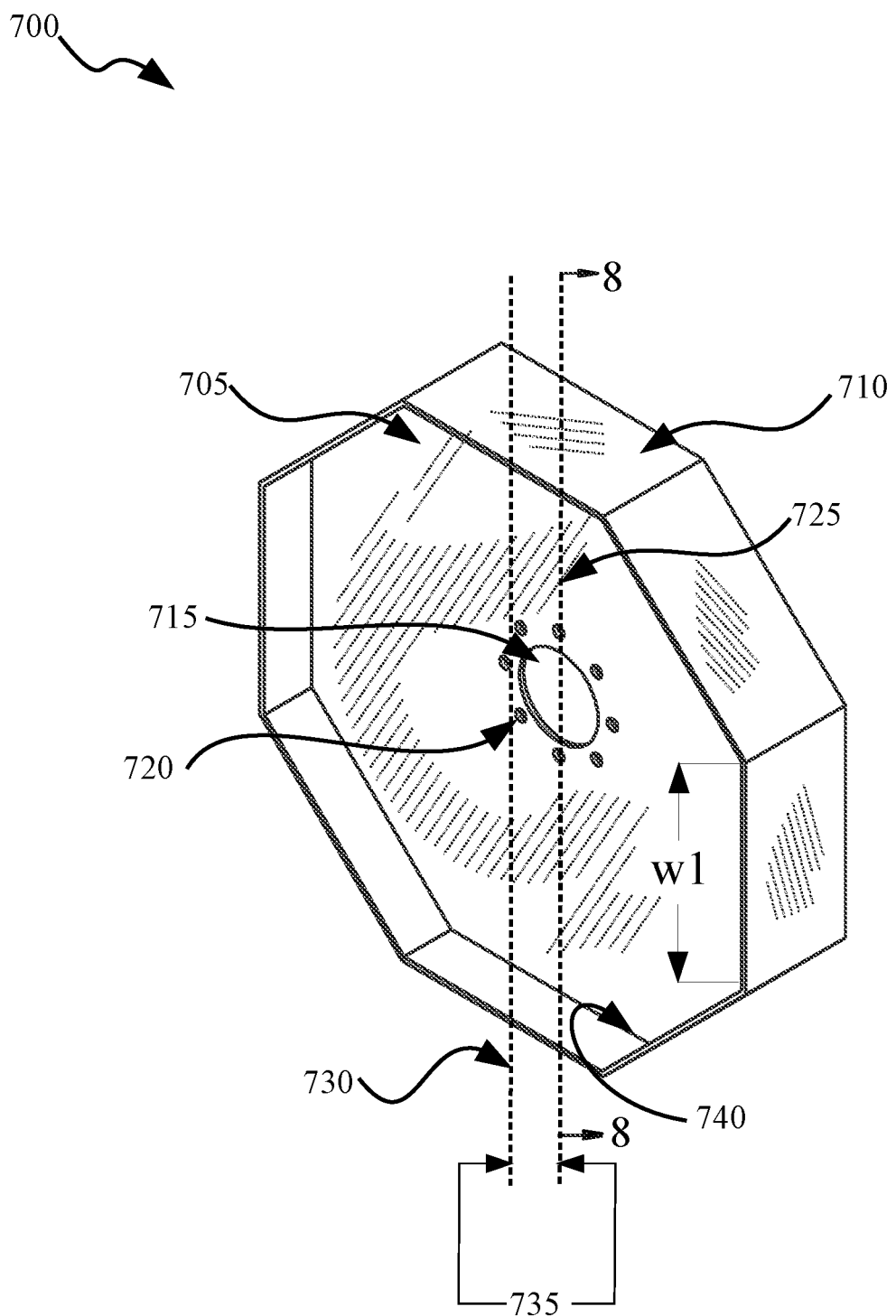
FIG. 7 shows a front right perspective view of a center plate vehicle support device (700) having a hexagonal construction with a plurality of lug bolt supports, and an at least one outer tangential circumferential plate.

FIG. 7 shows a front right perspective view of a center plate vehicle support device (700) having a hexagonal construction with eighth of a plurality of lug bolt supports (720), and an at least one outer tangential circumferential plate (710).

Shown in FIG. 7 are a polygonal center plate (705), an at least one outer tangential circumferential plate (710), an axle support (715), eight of a plurality of lug bolt supports (720), an axle support centerline (725), a vehicle support device centerline (730), a vertical centerline offset (735) between the axle support centerline (725) and the vehicle support device centerline (730), and an edge affixment (740) for an at least one outer tangential circumferential plate (710) to the polygonal center plate (705).

As shown in FIG. 7, a center plate vehicle support device (700) is similar to other variations of the vehicle support device. The center plate vehicle support device (700) may have any number of polygonal sides, any number of an at least one outer tangential circumferential plate (710), any number of a plurality of lug bolt supports (720), and may have a vertical centerline offset (735) between the axle support centerline (725) and the vehicle support device centerline (730).

The essential difference between a polygonal surface vehicle support device (100) and a polygonal center plate vehicle support device (700) is that the polygonal center plate (705) is aligned and affixed adjacent to, i.e., near or on an internal midline (855, FIG. 8), of the at least one outer tangential circumferential plate.

This difference does not, though, limit the actual location, i.e., positioning, of a polygonal surface (105) within a vehicle support device. A polygonal center plate (705) could be aligned between a front edge of the at least one outer tangential circumferential plate and the internal midline of the at least one outer tangential circumferential plate.

A polygonal center plate (705) could be aligned between a back edge of the at least one outer tangential circumferential plate (710) and the internal midline (855) of the at least one outer tangential circumferential plate (710).

A polygonal center plate (705) could be aligned along a rear edge of the at least one outer tangential circumferential plate (710). In variations without an at least one rear circumferential plate (345), this orientation is essentially turning a vehicle support device to face under a vehicle rather than away from a vehicle many vehicle support devices will likely have paint or other coatings on the polygonal surfaces. Turning a vehicle support device inwards may thus mitigate aesthetic and corrosion considerations.

Figure 8:
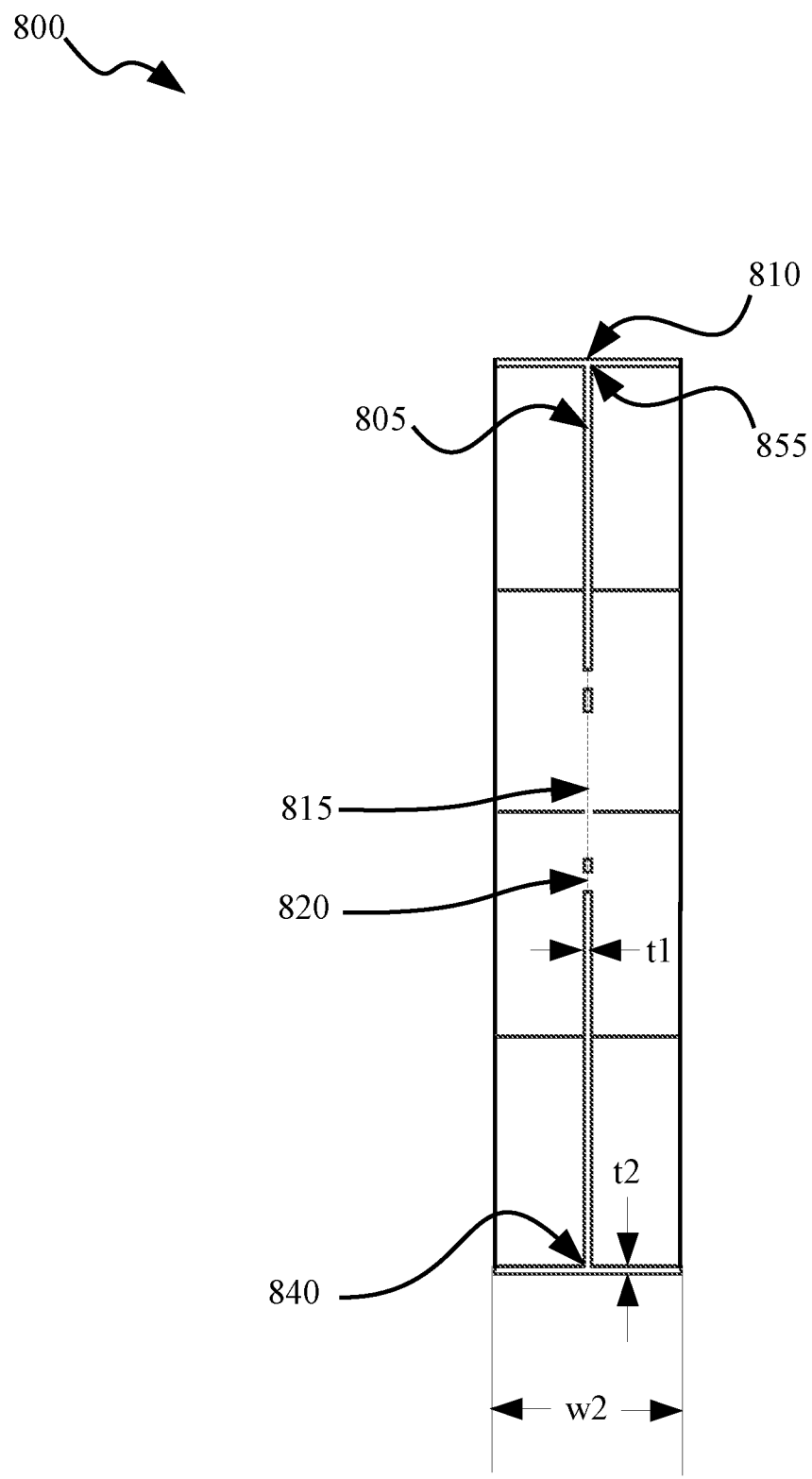
FIG. 8 shows a center section view of a center plate vehicle support device (800) with an upper at least one outer tangential circumferential plate and a lower at least one outer tangential circumferential plate.

FIG. 8 shows a center section view of a center plate vehicle support device (800) with an upper at least one outer tangential circumferential plate and a lower at least one outer tangential circumferential plate.

Shown in FIG. 8 are a polygonal center plate (805), an upper at least one outer tangential circumferential plate (810), a lower at least one outer tangential circumferential plate (810), an axle support (815), a plurality of lug bolt supports (720), a side view of an edge affixment (840) for an at least one outer tangential circumferential plate (810) to the polygonal center plate (805), and internal midline (855) of the at least one outer tangential circumferential plate (810).

Also shown in FIG. 8 are dimensional indicators t1, for thickness of the polygonal center plate (805), t2, for thickness of the at least one outer tangential circumferential plate (810), and w2, for lateral width of at least one outer tangential circumferential plate (810).

As previously discussed, the thickness t1 of the polygonal surface, and t2 of the at least one outer tangential circumferential plate (210), including weight of the vehicle, the number of axles on the vehicle, the stability of the surface on which the vehicle support device will rest, the grade of the surface on which the vehicle support device will rest, static use of the vehicle (i.e., storage, occupancy, etc.) during support by the vehicle support device, and intended duration of use. The method and reliability of affixment of the at least one outer tangential circumferential plate (810) to the polygonal center plate (805) should also be considered.

Similarly, w2, the lateral width of at least one outer tangential circumferential plate (810) should be balanced to the weight of the vehicle, the number of axles on the vehicle, the stability of the surface on which the vehicle support device will rest, the grade of the surface on which the vehicle support device will rest, static use of the vehicle (i.e., storage, occupancy, etc.) during support by the vehicle support device, the intended duration of use, and the method and reliability of affixment of the at least one outer tangential circumferential plate (810) to the polygonal center plate (805).

Figure 9:
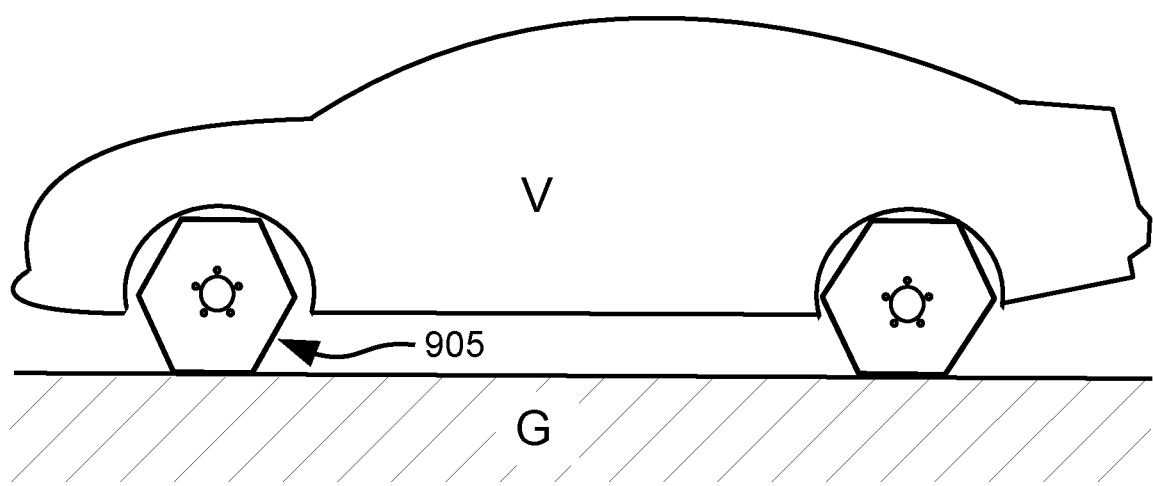
FIG. 09 shows a side view of a vehicle supported by a front vehicle support device and a rear vehicle support device.

FIG. 09 shows a side view of a vehicle supported by a vehicle front end vehicle support device and a vehicle rear end vehicle support device.

Shown in FIG. 9 are a vehicle ('V') supported on a level surface ('G") by a vehicle support device replacing a tire on the front axle, and another vehicle support device replacing a tire on the rear axle. If the surface ('G') is level, the front vehicle support device and the rear vehicle support device may be equally sized.

If though, the surface below the vehicle front end vehicle support device was elevated differently from the surface below the vehicle rear end vehicle support device, a different size (base height or side height) vehicle support device could be used.

And, if the surface below the front vehicle support device was angled differently from the surface below the rear vehicle support device, one of the vehicle support devices could be angled differently, or a different polygonal shape vehicle support device could be used to levelly set the frame of the vehicle.

If a symmetrical vehicle support device does not fit properly within a wheel well, the polygonal surface (105) may have at least one asymmetrical side (905).

Figure 10:
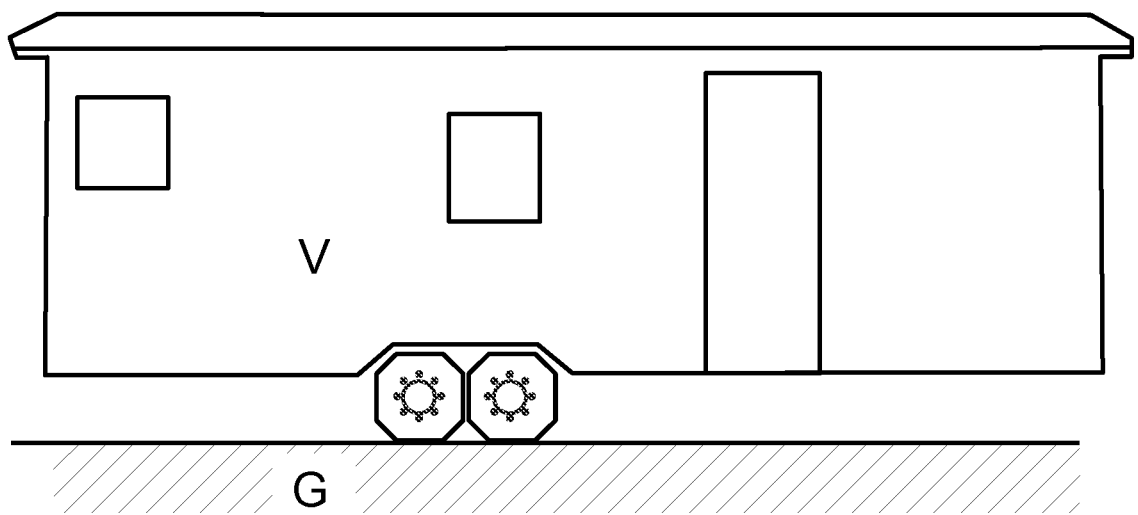
FIG. 10 shows a trailer supported by two vehicle support devices in a common wheel well.

FIG. 10 shows a trailer supported by a vehicle support device in a common wheel well.

Shown in FIG. 10 are a trailer (T) supported on a level surface ('G') by two vehicle support devices replacing the tire on the dual axles within the common wheel well. For stability, a jack ('J') is located near the front of the trailer.

Figure 11:
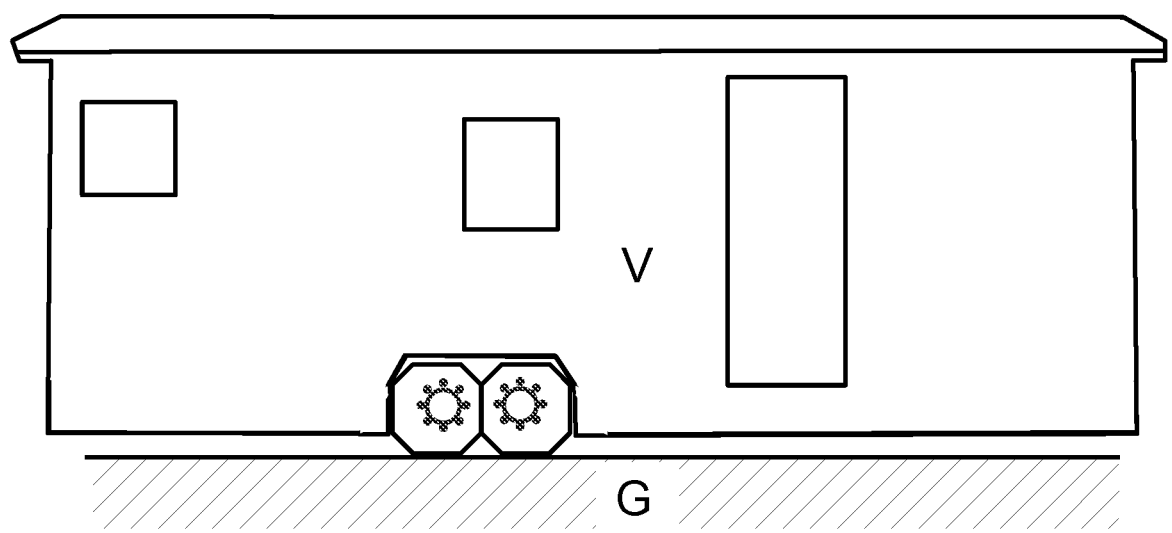
FIG. 11 shows a trailer supported by two vehicle support devices with offset axle support centerlines in a common wheel well.

FIG. 11 shows a trailer supported by two vehicle support devices with offset axle support centerlines in a common wheel well.

As shown in FIG. 11, a vehicle which may need a vehicle support device capable of supporting more weight may benefit from a vehicle support device with an offset axle support centerline. As shown here, one or more of a vehicle support device may be used within the wheel well with an offset axle support centerline to allow for one or more of a larger vehicle support device.

I claim:

1. A vehicle support device for use in lieu of a wheel comprising
 a polygonal surface (105) having a side length (a) and apothem (r),
 an at least one outer tangential circumferential plate (110) having a longitudinal width (w1) and a lateral width (w2),
 an axle support (115),
 a plurality of lug bolt supports (120),
 an axle support centerline (125),
 a vehicle support device centerline (130), and
 an edge affixment (140) to affix an at least one outer tangential circumferential plate (110) to the polygonal surface (105).

2. The vehicle support device of claim 1 wherein the polygonal surface (105) comprises a pentagon.

3. The vehicle support device of claim 1 wherein the polygonal surface (105) comprises a hexagon.

4. The vehicle support device of claim 1 wherein the polygonal surface (105) comprises an octagon.

5. The vehicle support device of claim 1 wherein the polygonal surface (105) is affixed to a front edge of the at least one outer tangential circumferential plate (110).

6. The vehicle support device of claim 1 wherein the polygonal surface (105) is affixed to an internal midline (855) of the at least one outer tangential circumferential plate (110).

7. The vehicle support device of claim 1 wherein the plurality of lug bolt supports (120) comprises five lug bolt supports.

8. The vehicle support device of claim 1 wherein the plurality of lug bolt supports (120) comprises seven lug bolt supports.

9. The vehicle support device of claim 1 wherein the plurality of lug bolt supports (120) comprises eight lug bolt supports.

10. The vehicle support device of claim 1 wherein the plurality of lug bolt supports (120) comprises twelve lug bolt supports.

11. The vehicle support device of claim 1 wherein the axle support centerline (125) is offset from the vehicle support device centerline (130) to comprise a non-zero vertical centerline offset (135).

12. The vehicle support device of claim 1 wherein the polygonal surface (105) comprises at least one asymmetrical side (905).

13. The vehicle support device of claim 1 wherein a first of the at least one outer tangential circumferential plate (110) comprises a wider longitudinal width (w1) than a second of the at least one outer tangential circumferential plate (110).

14. The vehicle support device of claim 1 wherein a first of the at least one outer tangential circumferential plate (110) comprises a narrower longitudinal width (w1) than a second of the at least one outer tangential circumferential plate (110).

15. The vehicle support device of claim 1 wherein a first of the at least one outer tangential circumferential plate (110) comprises a wider face width (w2) than a of the second at least one outer tangential circumferential plate (110).

16. The vehicle support device of claim 1 wherein a first of the at least one outer tangential circumferential plate (110) comprises a narrower face width (w2) than a second of the at least one outer tangential circumferential plate (110).

17. The vehicle support device of claim 1 further comprising an at least one rear circumferential plate (145) affixed to the at least one outer tangential circumferential plate (110).

18. The vehicle support device of claim 11 wherein a first vehicle support device comprises an axle support centerline (125) right of the vehicle support device centerline (130), and a second vehicle support device comprises an axle support centerline (125) left of the vehicle support device centerline (130).

* * * * *